US008441655B2

(12) United States Patent
Williams

(10) Patent No.: US 8,441,655 B2
(45) Date of Patent: May 14, 2013

(54) JOB-TICKET OPTIMIZED RENDERING

(75) Inventor: David A. Williams, San Jose, CA (US)

(73) Assignee: Ricoh Company, Ltd, Tokyo (JP)

( * ) Notice: Subject to any disclaimer, the term of this patent is extended or adjusted under 35 U.S.C. 154(b) by 1255 days.

(21) Appl. No.: 12/245,889

(22) Filed: Oct. 6, 2008

(65) Prior Publication Data

US 2010/0085590 A1 Apr. 8, 2010

(51) Int. Cl.
*G06F 3/12* (2006.01)
(52) U.S. Cl.
USPC ......... 358/1.13; 358/1.1; 358/1.15; 358/1.16; 358/1.18
(58) Field of Classification Search .................. None
See application file for complete search history.

(56) References Cited

U.S. PATENT DOCUMENTS

| | | | |
|---|---|---|---|
| 5,748,860 A * | 5/1998 | Shively | 358/1.15 |
| 6,268,927 B1 * | 7/2001 | Lo et al. | 358/1.15 |
| 2002/0181017 A1 | 12/2002 | Such et al. | |
| 2003/0011818 A1 * | 1/2003 | Nakagawa | 358/1.15 |
| 2003/0107766 A1 | 6/2003 | Ramot et al. | |
| 2003/0189724 A1 | 10/2003 | Kloosterman et al. | |
| 2004/0066527 A1 | 4/2004 | Kloosterman et al. | |
| 2004/0091162 A1 | 5/2004 | Donahue et al. | |
| 2004/0190057 A1 | 9/2004 | Takahashi et al. | |
| 2005/0105129 A1 | 5/2005 | Takahashi | |
| 2005/0283772 A1 * | 12/2005 | Muthukumar et al. | 717/151 |
| 2006/0048042 A1 | 3/2006 | Sembower et al. | |
| 2006/0048053 A1 | 3/2006 | Sembower et al. | |
| 2006/0197977 A1 | 9/2006 | Miyata | |
| 2007/0070374 A1 * | 3/2007 | Boyes et al. | 358/1.13 |
| 2007/0070377 A1 * | 3/2007 | Hirabayashi | 358/1.13 |
| 2007/0146767 A1 * | 6/2007 | Sakura | 358/1.14 |
| 2007/0165258 A1 | 7/2007 | Farrell et al. | |
| 2007/0263242 A1 | 11/2007 | Takahashi | |
| 2007/0277693 A1 | 12/2007 | Drexler | |
| 2008/0109270 A1 | 5/2008 | Shepherd et al. | |
| 2008/0144091 A1 | 6/2008 | Oshima | |
| 2008/0145125 A1 | 6/2008 | Mestha et al. | |

* cited by examiner

*Primary Examiner* — Miya J Cato
(74) *Attorney, Agent, or Firm* — Duft Bornsen & Fettig, LLP

(57) ABSTRACT

A print controller in a printing system includes a reprogrammable page description language (PDL) processor that defines a page-break function. The print controller also includes a job ticket interpreter. The print controller receives a printable file in the page description language that contains logical pages indicated by page-break indicators. The job ticket interpreter receives a job ticket associated with the printable file and containing layout parameters for the logical pages. The job ticket interpreter re-defines the page-break function in the PDL processor so that the print controller prints a plurality of the logical pages without referencing the job ticket for each page. In some embodiments, the PDL processor is a PostScript processor and the job ticket interpreter is a JDF interpreter encoded as a PostScript program interpreted by the PostScript interpreter.

14 Claims, 7 Drawing Sheets

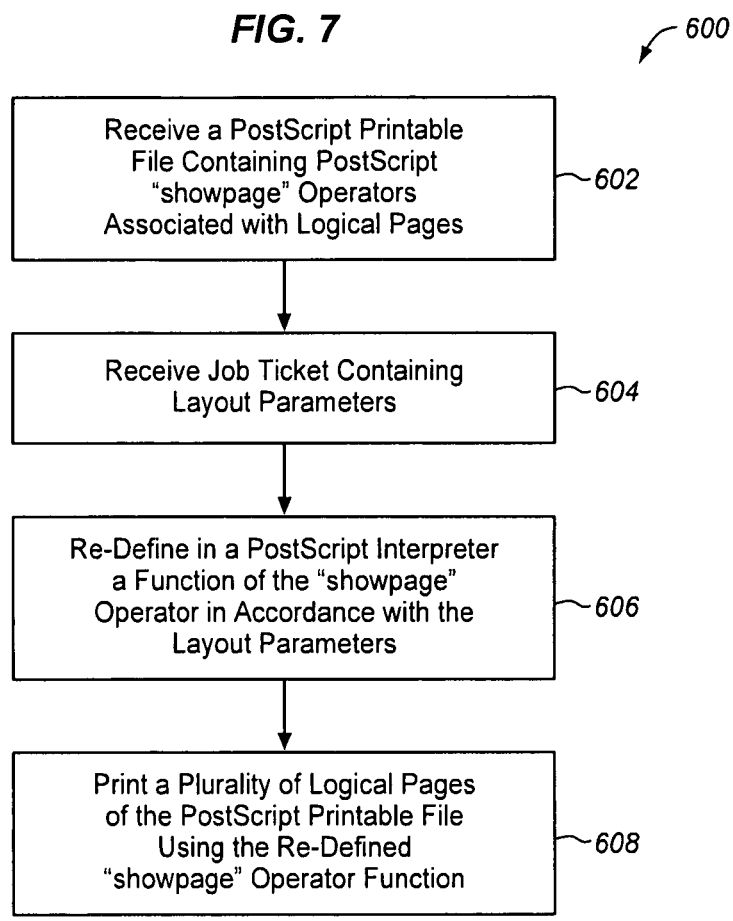

JOB-TICKET OPTIMIZED RENDERING

BACKGROUND

1. Field of the Invention

The invention relates to the field of printing systems, and in particular, to processing JDF job tickets in a printing system to re-define printing commands in a printing file.

2. Discussion of Related Art

Printing systems generally include a localized print controller that connects to one or more host systems. The print controller controls the overall operation of the printing system including, for example, host interfacing, interpretation or rendering, and lower level process control or interface features of the print engines of the printing system. Host interaction may include appropriate adapters for coupling the printing system to one or more host systems that transmit printable files to the printing system. The printable files (also referred to as print data files or content files, among other designations) are generally encoded in the form of a page description language (PDL), such as PostScript (PS), Portable Document Format (PDF), Printer Command Language (PCL), etc.

In whatever form the printable files may be encoded or formatted, the print controller within the printing system interprets or renders the file to generate sheetside bitmaps of the file. For example, the printable file may include page descriptions for each logical page of the file that are written in a particular PDL. The print controller may then interpret the page descriptions for each page to generate the sheetside bitmaps for the file. The sheetside bitmaps represent the images to be printed on one side of a sheet of paper by a print engine. The print controller stores or buffers the sheetside bitmaps in accordance with storage capabilities of the particular print controller. The print controller then forwards the sheetside bitmaps to one or more print engines (also referred to as an imaging engine or as a marking engine) for printing.

In conventional printing systems, when the host system is instructed to print a particular file comprised of textual and graphical content, the host system converts the file into a printable file in one of a variety of PDLs. The host system also includes printing parameters (also referred to as device control commands or instructions) with the printable file.

One way of describing the printing parameters for a print job is through creation of a job ticket. A job ticket defines a print job and associates one or more printable files with information that defines various printing parameters for actual physical printing of the printable files. Among other things, a job ticket may include layout parameters indicative of where each logical page defined by the PDL of the printable files is to be placed on a sheet side of the printable medium. One common standard for defining a job ticket is the Job Definition Format (JDF). The JDF job ticket, as presently defined for JDF by the CIP4 Organization, which is known to those skilled in the art, is written in Extensible Markup Language (XML) format. In conventional printing systems, processing of JDF job tickets is performed in the host system. In response to receiving or identifying a JDF job ticket, the host system processes the JDF job ticket to identify the printing parameters for a print job. The host system then generates a printable file in the appropriate PDL that includes the content intended for printing and also includes the printing parameters defined in the job ticket to modify or adjust the actual printed output. This can cause problems as it may overload the host system in processing the JDF job ticket and generating the printable files, as the printable files with the included printing parameters can get quite large. Also, if a network connection is used between the host system and the printing system, then the large printable files may congest the network or unnecessarily use up network resources.

To alleviate such problems, co-owned and co-pending U.S. patent application Ser. No. 12/118,191, filed May 9, 2008 (hereinafter U.S. application Ser. No. 12/118,191), teaches a printing system that processes job tickets in the printing system instead of a host system. Thus, the host system may transmit a job ticket and a printable file to the printing system for processing, instead of processing the job ticket locally on the host system. The print controller in the printing system then processes the job ticket to identify the printing parameters defined in the job ticket, and controls printing of the printable file based on the identified printing parameters. The processing of job tickets is advantageously moved from the host system to the printing system, which relieves the processing responsibility from the host system and avoids transmitting large files over a network.

In the field of production printing, print jobs often consist of a printable file and a job ticket, as described above. In particular, the layout and imposition parameters of the job ticket may define a new placement, size and orientation for the printed pages that is different from what is described in the PDL printable file. On the other hand, the layout parameters for each logical page of the printable file may be substantially identical. In a printing system as in U.S. application Ser. No. 12/118,191, in which a print controller process both the printable file and the job ticket, the printing system may open the original printable file, seek to the first logical page, execute its instructions, then switch to the job ticket to execute printing instructions in accordance with the new layout parameters, then return to the printable file, seek to the second page, execute its instructions, switch again to the job ticket file to execute substantially identical layout instructions, and so on. Use of a printing system in which the printer receives and parses a job ticket reduces the burden on the host system, but the repeated processing of the layout parameters within the job ticket for each logical page of the printable file is time-consuming. Thus, improved techniques are needed to efficiently process a job ticket as regards layout parameters when processing a job ticket within a printing system.

SUMMARY OF THE INVENTION

Embodiments of the present invention help to solve some of the problems described above by providing systems and methods in which a job ticket interpreter in a printing system re-defines the processing of page-break indicators of multiple logical pages in a printable file in accordance with layout parameters from a job ticket such that the re-defined page-break indicators perform the appropriate layout function for the page following the page-break indicator that is normally performed by the job ticket interpreter.

An exemplary embodiment in accordance with the invention of a print controller in a printing system comprises: a reprogrammable page description language processor (PDL) that defines a function of a page-break indicator; and a job ticket interpreter. The print controller is operable to receive a printable file that contains a plurality of page-break indicators, each indicating a logical page. The print controller is also operable to receive a job ticket that is associated with the printable file and that contains layout parameters. The job ticket interpreter is operable to re-define the function of the page-break indicator of the reprogrammable PDL processor in accordance with the layout parameters in the job ticket. The print controller is operable to print a plurality of the logical pages of the printable file after the job ticket interpreter re-defines the function of the page-break indicator. Thus, preferably the print controller is operable to print a plurality of the logical pages of the printable file after the job ticket interpreter re-defines the function of the page-break indicator and before any further reference to the job ticket. In some embodiments, the print controller is operable to print all of the logical pages of the printable file after the job ticket interpreter re-defines the function of the page-break indicator and without further reference to the job ticket. In some embodiments, the reprogrammable PDL processor comprises a PostScript interpreter that defines a function of a PostScript "showpage" operator. Thus, in some embodiments, the print controller is operable to print a plurality of the logical pages of a PostScript printable file after the job ticket interpreter re-defines the function of the showpage operator and before any further reference to the job ticket. In some embodiments, the job ticket interpreter comprises a JDF (Job Definition Format) job ticket interpreter.

An exemplary embodiment of a method in accordance with the invention of processing job tickets in a printing system comprises: receiving a printable file from a host system and receiving a job ticket associated with the printable file. The printable file contains a plurality of page-break indicators, each page-break indicator indicating a logical page. The job ticket contains layout parameters for printing the pages. The exemplary method further comprises re-defining in a reprogrammable page description language (PDL) processor a function of a page-break indicator in accordance with the layout parameters; and printing a plurality of the logical pages of the printable file after the job ticket interpreter re-defines the function of the page-break indicator. Some embodiments further comprise printing a plurality of the logical pages of the printable file after the job ticket interpreter re-defines the function of the page-break indicator and before any further reference to the job ticket. Accordingly, some embodiments comprise printing all of the logical pages of the printable file after the job ticket interpreter re-defines the function of the page-break indicator and without further reference to the job ticket. Some embodiments comprise receiving a PostScript printable file containing a PostScript showpage operator and re-defining the function of the PostScript showpage operator in a PostScript interpreter. Some embodiments further comprise printing a plurality of the logical pages of the PostScript printable file after the job ticket interpreter re-defines the function of the PostScript showpage operator and before any further reference to the job ticket. Accordingly, some embodiments comprise printing all of the logical pages of the PostScript printable file after the job ticket interpreter re-defines the function of the PostScript showpage operator and without further reference to the job ticket. In some embodiments, receiving the job ticket comprises receiving a JDF job ticket.

The invention may include other exemplary embodiments described below.

BRIEF DESCRIPTION OF THE DRAWINGS

The same reference number represents the same element or same type of element on all drawings.

FIG. 7 is a flow chart illustrating a method of processing JDF job tickets in printing system in an exemplary embodiment of the invention.

DETAILED DESCRIPTION OF THE DRAWINGS

FIGS. 1 and 4 through 7 and the following description disclose specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
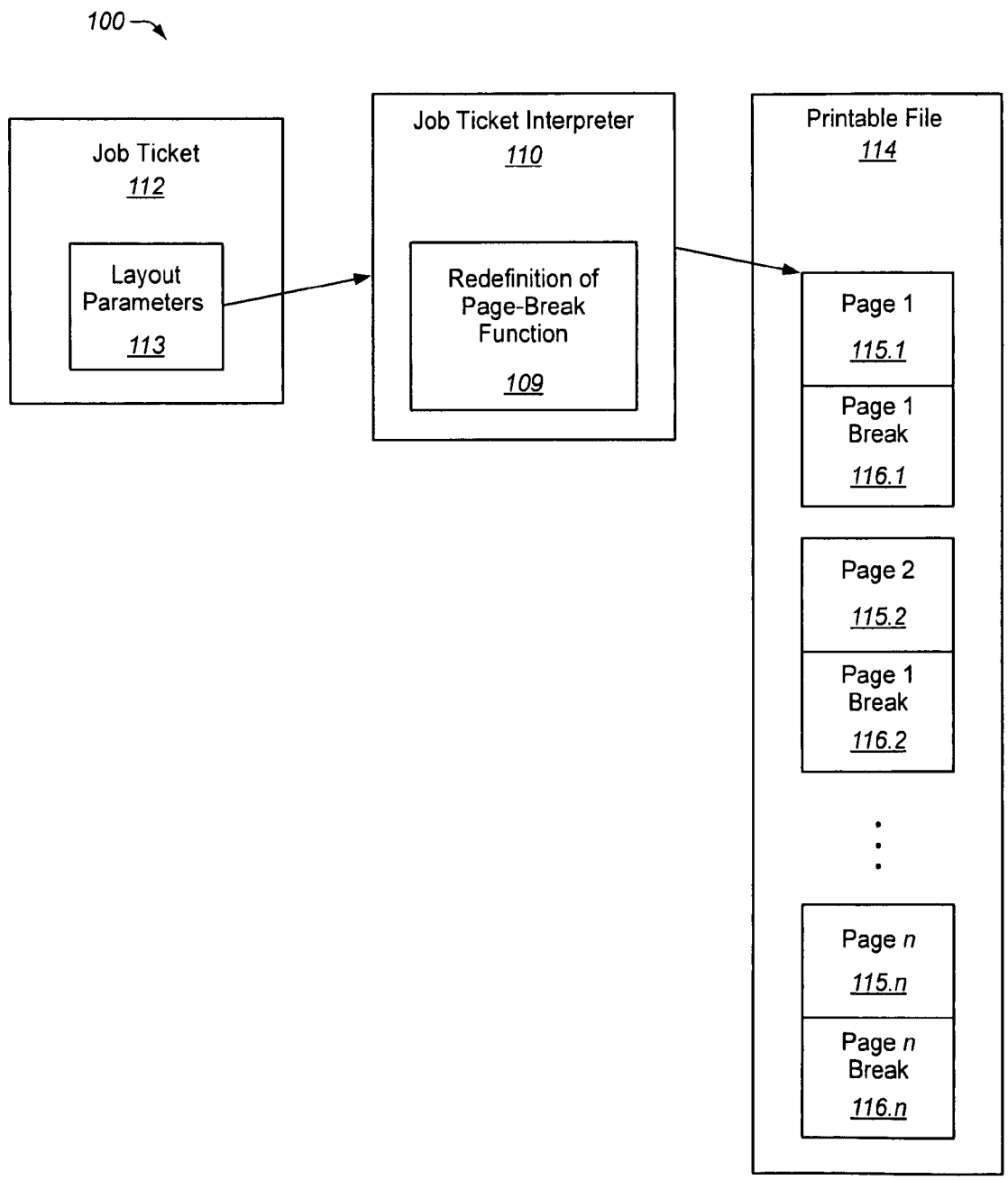
FIG. 1 depicts schematically an exemplary printing environment in accordance with the invention.

FIG. 1 depicts schematically an exemplary printing environment 100 in accordance with the invention comprising a job ticket interpreter 110 that is operable to receive a job ticket 112 having layout parameters 113 that is associated with a printable file 114 having a plurality of logical pages 115. Typically, each of logical pages 115 has a page-break indicator 116. Job ticket interpreter 110 is operable to re-define the function of the page-break indicators 116 of each a plurality of logical pages 115 in accordance with the layout parameters 113 of job ticket 112; that is, job ticket interpreter 110 is operable to re-define the function of the page-break indicator 116 of the plurality of logical pages 115 such that re-defined page-break indicator 116.$n-1$ of page $n-1$ performs the appropriate layout function of page n following page-break indicator 116.$n-1$ that is normally performed by a job ticket interpreter. Interpreter 110 stores its redefinition of the page-break function in element 109 (e.g., a dictionary or other suitable memory element that stores the function to be performed when a page-break is encountered in the processing of printable file 114). As a result, the print controller of a printing system that job ticket interpreter 110 is serving need not reference job ticket 112 each time the print controller formats a logical page 115 of printable file 114. Instead, the print controller encounters the redefinition of page-break indicator 116 as it processes each logical page 115, which redefinition of page-break indicator provides the layout parameters needed by the print controller for printing of each logical page. More specifically, for example, the print controller processes page 1 115.1 of printable file 114 and then encounters page 1 break 116.1. The re-defined function of page-break processing (109) is then used to perform the page-break function for break 116.1. In like manner, page 2 115.2 is processed up to the page 2 break 116.2 and the re-defined page-break processing is again invoked and so on through page n 115.$n$ and page n break 116.$n$. Embodiments in accordance with the invention function efficiently when logical pages in a printable file are printed sequentially corresponding to their sequential ordering in a printable file and also when the layout parameters for each logical page are either identical or similar. Nevertheless, embodiments in accordance with the invention are also useful when logical pages are printed in a different order from their order in the printable file, as well as when the layout parameters for each logical page are not identical. In such cases, a single job ticket may include specific layout parameters for one or more logical pages that are different from layout parameters included in the same job ticket for one or more other logical pages.

Figure 2:
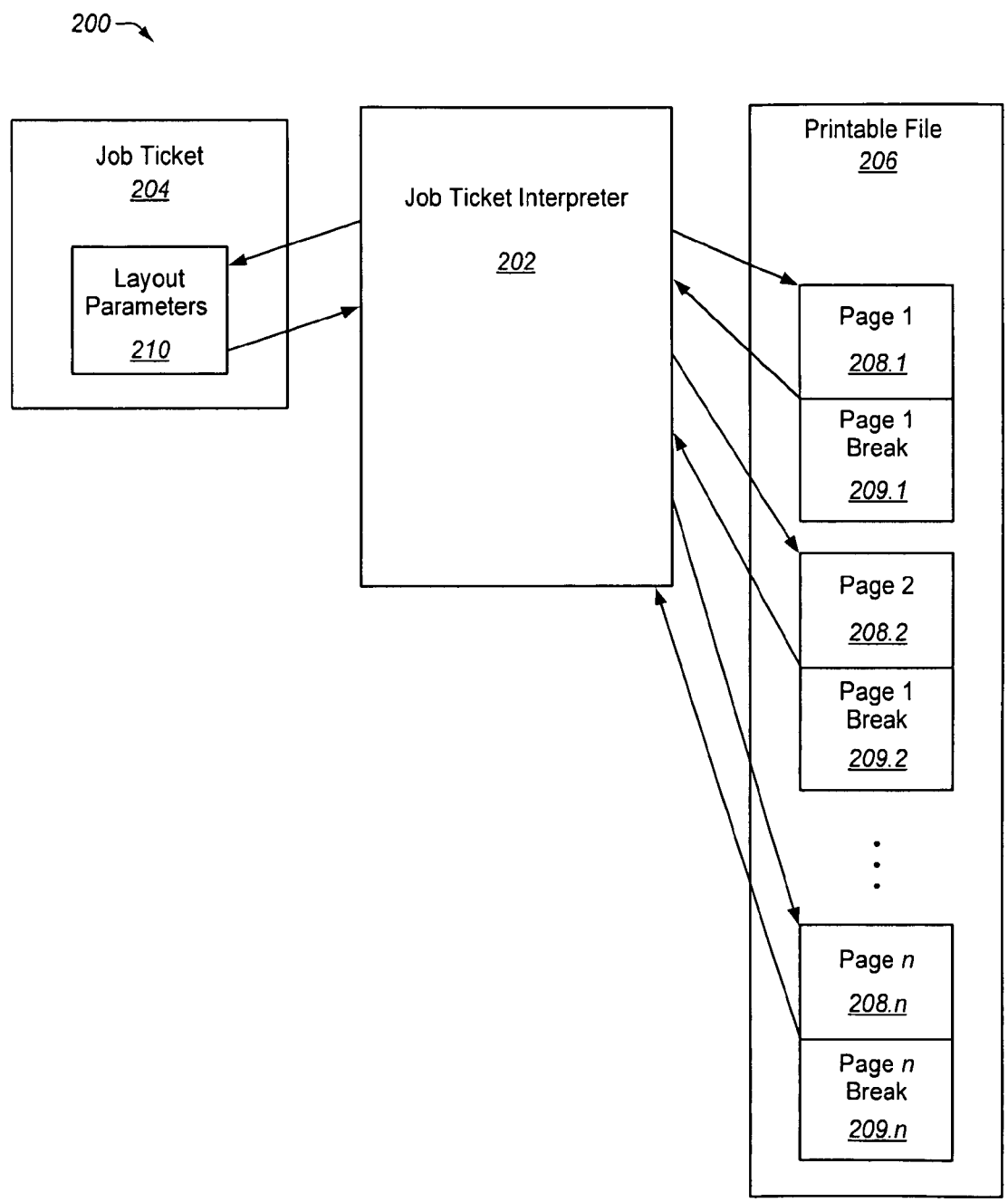
FIG. 2 depicts schematically an exemplary printing environment as presently known that includes a job ticket interpreter not in accordance with the invention.

By way of contrast, FIG. 2 depicts schematically an exemplary printing environment 200 as presently known that includes a job ticket interpreter that is not in accordance with the invention. The job ticket interpreter 202 of FIG. 2 as presently known does not include the improvements of the invention to redefine the page break processing. A job ticket interpreter 202 of a printing system is operable to process a job ticket 204 associated with a printable file 206 containing a plurality of logical pages 208 (e.g., pages 208.1 through 208.n) that contain page break indicators 209 (e.g., 209.1 through 209.n). Job ticket 204 includes layout parameters 210 used for printing logical pages 208. As depicted in FIG. 2, during processing of printable file 206 for printing, each time a logical page 208 is processed and a page-break indicator 209 is encountered, the printing system must switch processing back to job ticket interpreter 202, which then processes job ticket 204 again in order to communicate layout parameters 210 for each logical page. Processing of the interpreter 202 then switches back, again, to processing of the file 206 starting at the beginning of the next page 208. The switching of processing between the printable file 206 and the job ticket file 204 is shown by the numerous arrows directed to and from the printable file 206 and the interpreter and between the interpreter and the job ticket file 204.

Figure 3:
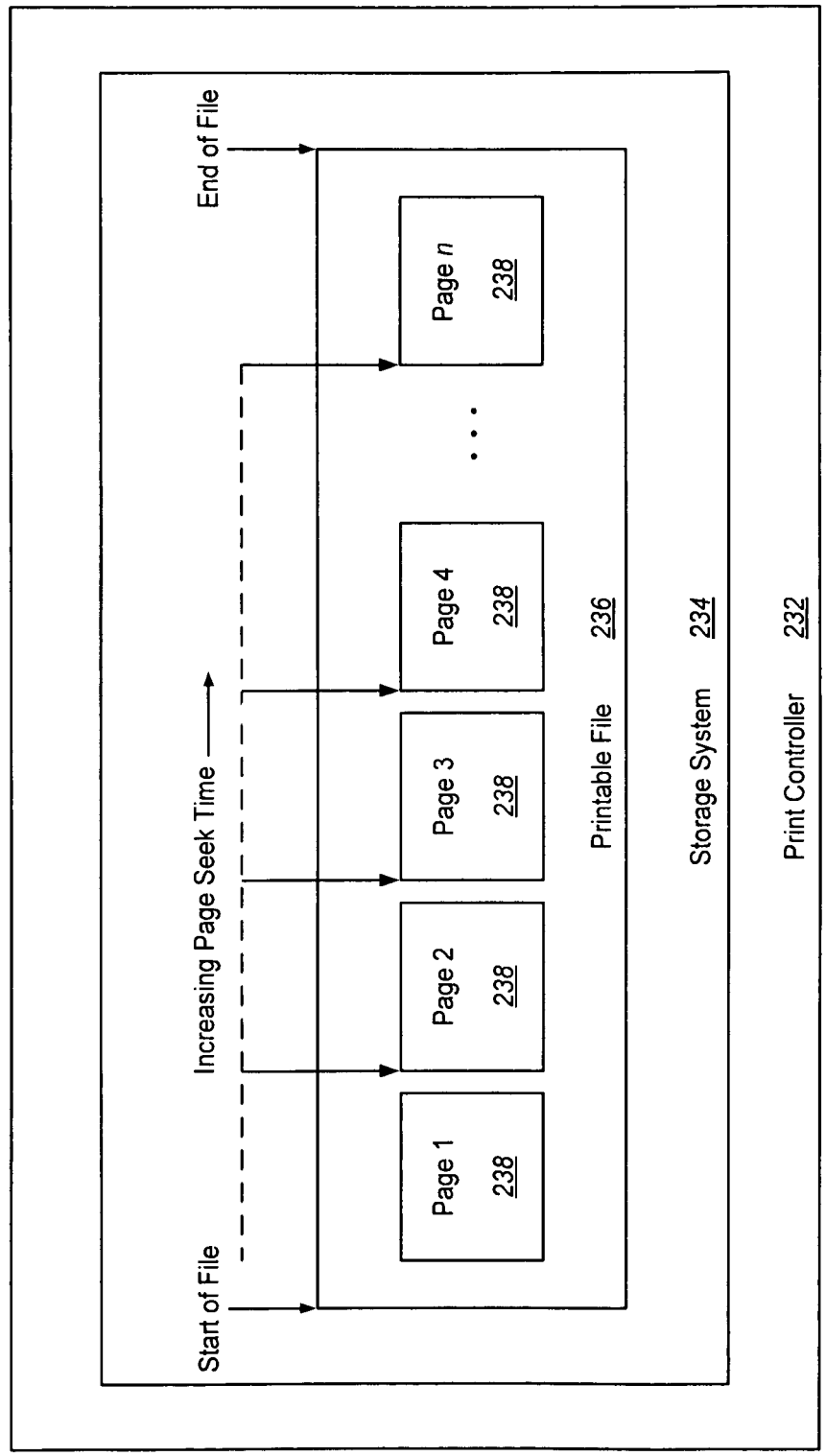
FIG. 3 depicts schematically exemplary sequential operations of a print controller of a printing system as presently known that includes a job ticket interpreter not in accordance with the invention.

FIG. 3 depicts schematically exemplary sequential operations of a print controller 232 of a printing system as presently known that includes a job ticket interpreter not in accordance with the invention, but instead processes a job ticket repeatedly for each logical page, as described above with reference to FIG. 2. Print controller 232 includes storage system 234 in which printable file 236 is stored. Printable file 236 comprises a plurality of page descriptions corresponding to a plurality of logical pages 238. Where the job ticket interpreter is implemented as a PostScript program in a printer, significant processing time may be consumed by switching processing between information in a printable file and a file that stores the job ticket. As the interpreter 202 processes a page 208 of the printable file 206 it encounters a page break 209. Processing of the interpret switches at each page break 209 from the printable file 236 back to the layout parameters 210 in the job ticket file 204. After processing the layout parameters 210 to effectuate the page break, processing again switches back to the printable file 206 to process a next page 208. As depicted in FIG. 3, the farther a given page 238 is sequentially located from the start ("Page 1") of the file, the more time it takes to seek to a given page description, execute job ticket instructions, then switch again to the job ticket for new instructions, and so forth. This processing of switching back and forth between the job ticket file 204 and the printable file 206 consumes significant processing time in the interpreter 202 and thus degrades overall performance of the printing system. Such processing overhead is particularly onerous in a PostScript interpreter but may also be present in other interpreters.

Figure 4:
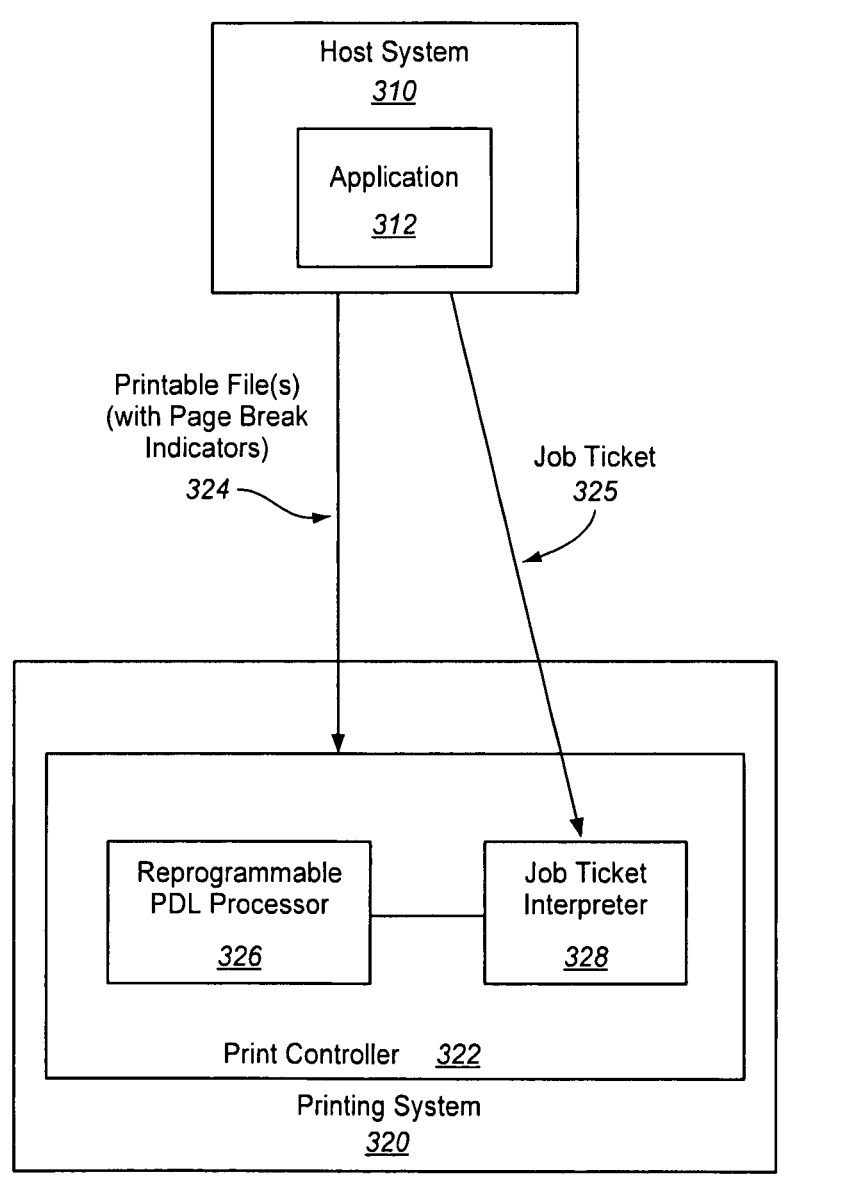
FIG. 4 illustrates another printing environment in an exemplary embodiment of the invention.

FIG. 4 illustrates a printing environment 300 in an exemplary embodiment of the invention. Printing environment 300 includes one or more host systems 310 in communication with a printing system 320. Host system 310 comprises any computer, server, or other device operable to execute an application 312 to generate or provide printable files. A printable file comprises any digital file having text, images, or other content to be printed on printing system 320. The printable files may be formatted in any reprogrammable page description language, such as PostScript (PS). Host system 310 may also generate or receive a job ticket that is associated with a printable file. A job ticket comprises any data that defines a print job regarding how a printable file is to be processed for printing, such as the type of input media to be used in printing a file, the size of pages in the file, alignment of graphics or text on the pages, the type of finishing for the pages, etc. When host system 310 submits a print job to printing system 320, host system 310 transmits the printable file and the job ticket to printing system 320. Alternatively, the job ticket may include an address or an indicator of the location of a printable file, and printing system 320 may retrieve the printable file.

Printing system 320 comprises any system used to put marks on media. Printing system 320 may comprise any printing system including ink-jet and electrophotographic and price/performance ranges from personal/home use through large production printing systems (e.g., a continuous forms printer or a cut sheet page printer). Printing system 320 includes a print controller 322. Print controller 322 comprises any system, server, or components operable to control the printing of files on printing system 320.

Print controller 322 is operable to receive a printable file 324 (e.g., from host system 310) that contains a plurality of page-break indicators, each page break indicator indicating a logical page in the printable file. Print controller 322 is further operable to receive a job ticket 325 that is associated with printable file 324 and that contains layout parameters. Print controller 322, in this embodiment, comprises a reprogrammable PDL processor 326 and a job ticket interpreter 328. Reprogrammable PDL processor 326 is operable to define a function of a page break indicator. Job ticket interpreter 328 is operable to re-define the function of the page break indicator of reprogrammable PDL processor 326 in accordance with layout parameters in job ticket 325; that is, job ticket interpreter 328 is operable to re-define the function of the page-break indicator of the plurality of logical pages such that the re-defined page-break indicator performs the appropriate layout function of the page following a page-break indicator that is normally performed by a job ticket interpreter. Job ticket interpreter 328 comprises any system, server, or components operable to receive and process a job ticket to determine how a printable file is to be processed on printing system 320. Print controller 322 is further operable to print a plurality of logical pages of printable file 324 after job ticket interpreter 328 re-defines the function of the page break indicator in reprogrammable PDL processor 326. In accordance with the invention, print controller 322 is operable to print a plurality of logical pages after job ticket interpreter 328 re-defines the function of the page break indicator before any further reference to job ticket 325 by job ticket interpreter 328. Although not shown, print controller 322 may include other components for processing raw data for a file, components for rendering or interpreting the raw data to generate bitmaps, and components for queuing or buffering the bitmaps for subsequent transfer to a print engine.

Figure 5:
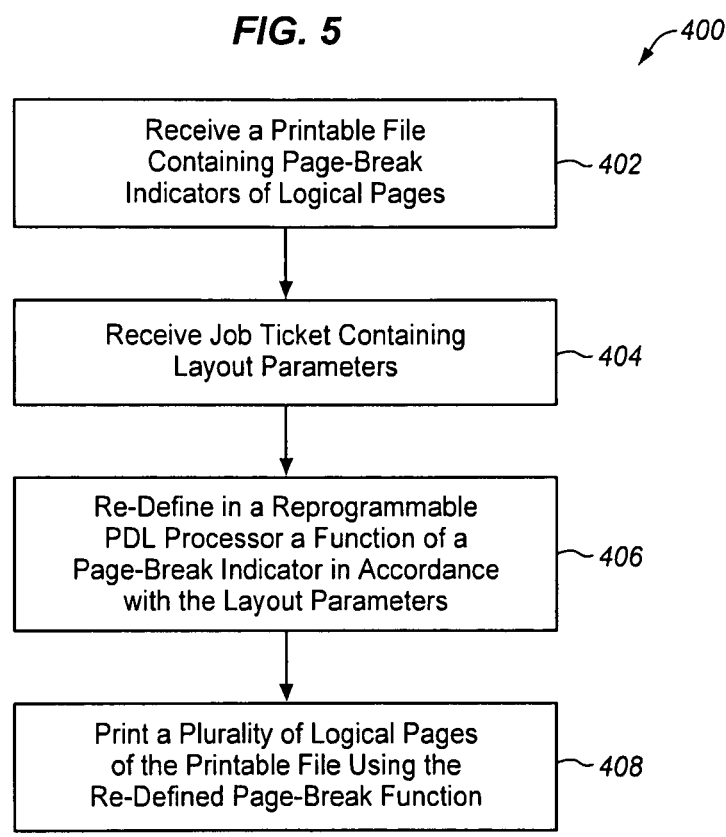
FIG. 5 is a flow chart illustrating another method of processing JDF job tickets in a printing system in an exemplary embodiment of the invention.

FIG. 5 is a flow chart illustrating a method 400 of processing job tickets in printing system 320 in an exemplary embodiment of the invention. The steps of method 400 will be described with reference to printing system 320 in FIG. 4, although method 400 may be performed by other systems.

The steps of the flow chart in FIG. 5 are not all inclusive and may include other steps not shown.

In step 402, print controller 322 receives one or more printable files 324. The printable files may be received from host system 310 as illustrated in FIG. 4, or may be received from another system or server. Printable file 324 contains a plurality of page-break indicators, each page-break indicator indicating a logical page. In step 404, print controller 322 receives a job ticket from host system 310 or another system. The job ticket is associated with one or more printable files 324. In step 406, job ticket interpreter 328 re-defines a function of a page-break indicator in reprogrammable PDL processor 326 in accordance with the layout parameters contained in job ticket 325; that is, job ticket interpreter 328 re-defines the function of the page-break indicator in reprogrammable PDL processor 326 such that the re-defined page-break indicator performs the appropriate layout function of the page following a page-break indicator that is normally performed by a job ticket interpreter. Thereafter, in step 408, print controller 322 prints a plurality of the logical pages of printable file 324 before any further reference to job ticket 325.

In some printing applications, a preamble of a printable file contains printing parameters, for example, layout parameters, of the type typically included in a job ticket. In some cases, the preamble of a printable file may practically re-define a page-break indicator in a manner inconsistent with the redefinition of a page break indicator in a job ticket in accordance with the invention. In such cases, if a job ticket were processed in accordance with the invention to re-define a page-break indicator and then the preamble of the printable file were processed, resulting in a second, undesired redefinition of the page break indicator, a benefit of the present invention could be frustrated. Therefore, in printing applications in which the beginning (preamble) of a printable file would practically re-define the definition of a page break indicator in the printing system, the beginning (e.g., the first logical page) of the printable file is processed initially, followed by processing of the job ticket by the job ticket interpreter. In some exemplary embodiments, this is accomplished by processing the beginning of the printable file until the page-break indicator of the first logical page is reached, and thereafter processing the job ticket to re-define the page break indicator. For example, in some embodiments, a PostScript interpreter processes the beginning of a PostScript printable file until it reaches the showpage operator of the first logical page, then the JDF interpreter processes the JDF job ticket and re-defines the showpage operator in accordance with the layout parameters contained in the job ticket.

Many print controllers include PostScript interpreters that are operable to interpret files and programs coded according to the PostScript language. The following illustrates a specific embodiment of implementing the JDF interpreter as a PostScript program. Although PostScript will be described in the following embodiment, other languages may be used to implement the JDF interpreter in other embodiments.

Figure 6:
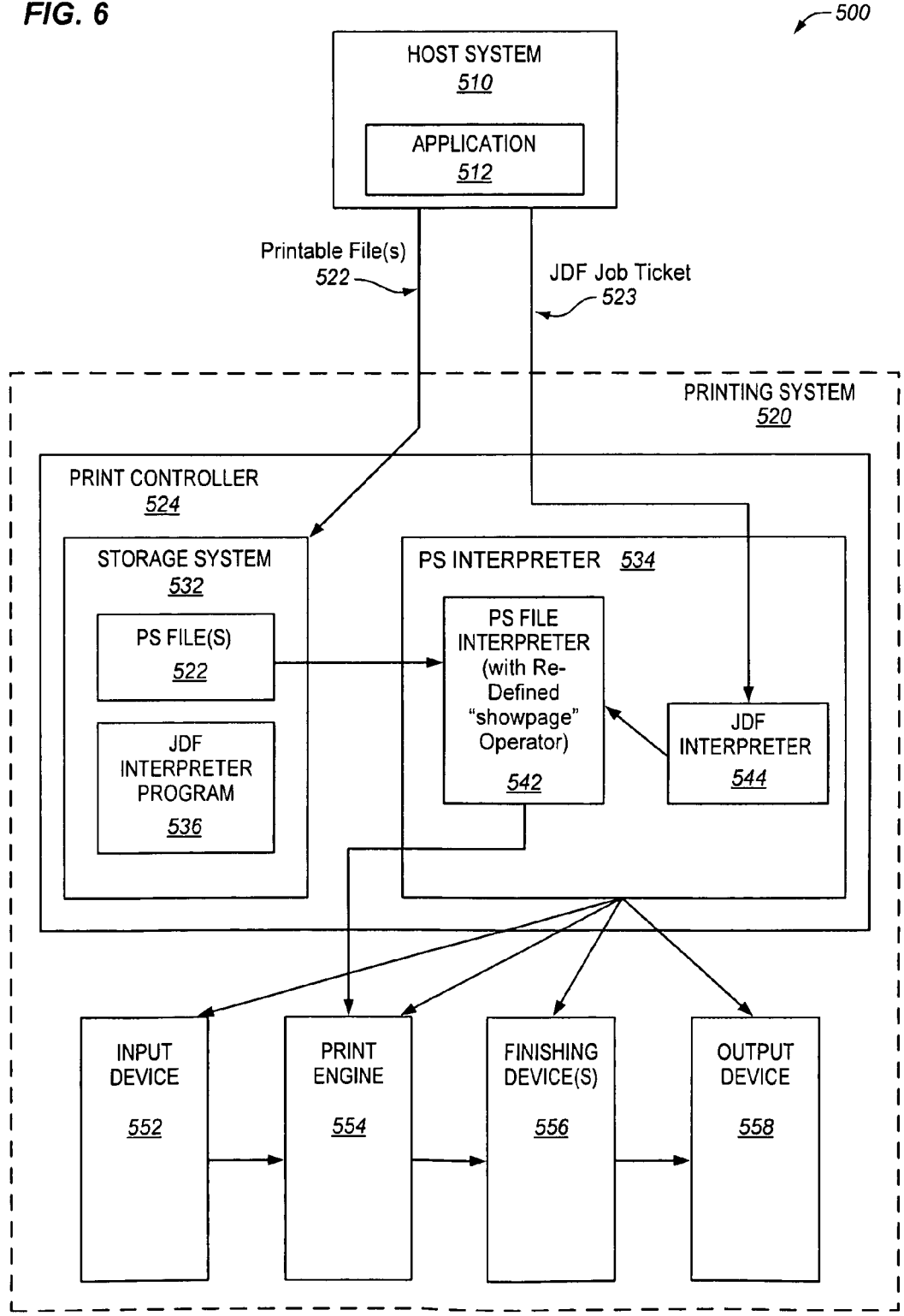
FIG. 6 illustrates another printing environment in an exemplary embodiment of the invention in which the job ticket interpreter is the JDF interpreter and the reprogrammable PDL processor is a PostScript interpreter.

FIG. 6 illustrates another printing environment 500 in an exemplary embodiment of the invention in which the job ticket interpreter is the JDF interpreter and the reprogrammable PDL processor is a PostScript interpreter. Printing environment 500 includes one or more host systems 510 in communication with a printing system 520. Host system 510 is able to execute an application 512 to generate or provide one or more PostScript files 522 to printing system 520. Printing system 520 includes a print controller 524, an input device 552, one or more print engines 554, one or more finishing devices 556, and an output device 558. As in other embodiments, print controller 524 is operable to process a JDF job ticket 523 received from host system 510 or another system. To provide such functionality, print controller 524 includes a storage system 532 and a PostScript interpreter 534. A PostScript interpreter comprises any system, server, or components operable to translate or decode PostScript statements into executable form and execute the statements. In accordance with the invention, a job ticket interpreter in print controller 524 is operable to re-define the function of the showpage operator in PostScript interpreter 534 in accordance with the layout parameters in JDF job ticket 523. PostScript interpreter 534 may be implemented as one or more processors executing instructions to perform the functionalities of an interpreter.

In this embodiment, storage system 532, or another memory in print controller 524, stores a JDF interpreter program 536. JDF interpreter program 536 is written in the PostScript language. Because JDF interpreter program 536 is written in PostScript language, PostScript interpreter 534 is able to interpret JDF interpreter program 536 as it would other PostScript programs or files. PostScript interpreter 534 is illustrated in FIG. 6 as including JDF interpreter 544 and PostScript file interpreter 542. JDF interpreter 544 represents the functions or actions performed by PostScript interpreter 534 when interpreting JDF interpreter program 536. PostScript file interpreter 542 represents the functions or actions performed by PostScript interpreter 534 when interpreting PostScript files to be printed as stored in storage system 532. In accordance with the invention, JDF interpreter 544 is operable to re-define the function in PostScript file interpreter 542 of the PostScript showpage operator in accordance with the layout parameters of JDF job ticket 523; that is, JDF interpreter 544 re-defines the processing of page-break indicators of multiple logical pages in printable file 522 in accordance with layout parameters from job ticket 523 such that the re-defined page-break indicators perform the appropriate layout function for the page following the page-break indicator that is normally performed by a job ticket interpreter.

Generally, JDF interpreter 544 issues the PostScript commands for the printing parameters. To issue the PostScript commands, JDF interpreter 544 transmits the PostScript commands to the PostScript file interpreter 542, which is able to interpret the PostScript commands to perform the desired functions. PostScript file interpreter 542 then interprets the PostScript file and the PostScript commands from JDF interpreter 544 to print the PostScript printable file. By re-defining the definition of the showpage operator in PostScript file interpreter 542, time-consuming and resource-consuming communications between PostScript file interpreter 542 and JDF interpreter 544 are avoided.

FIG. 7 is a flow chart illustrating a method 600 of processing JDF job tickets in printing system 520 in an exemplary embodiment of the invention. The steps of method 600 will be described with reference to printing system 520 in FIG. 6, although method 600 may be performed by other systems. The steps of the flow chart in FIG. 7 are not all inclusive and may include other steps not shown.

In step 602, print controller 524 receives a PostScript printable file 522 containing PostScript showpage operators associated with logical pages in printable file 522. The PostScript file may be received from host system 510 as illustrated in FIG. 7, or may be received from another system or server. At some point, one or more of the PostScript files are retrieved from storage system 532, and are sent to PostScript interpreter 534 for processing.

In step 604, print controller 524 receives a JDF job ticket 523 containing layout parameters for PostScript printable file 522. Print controller 524 receives a JDF job ticket from host system 510 or another system. A JDF job ticket is written in XML format. In step 606, JDF interpreter 544 re-defines in PostScript interpreter 534 the function of the PostScript showpage operator in accordance with the layout parameters contained in JDF job ticket 523; that is, JDF interpreter 544 re-defines the function of the page-break indicator of the plurality of logical pages such that the re-defined page-break indicator performs the appropriate layout function of the page following a page-break indicator that is normally performed by a job ticket interpreter. In step 608, after redefinition of the showpage operator, print controller 524 prints a plurality of logical pages of PostScript printable file 522 before any further reference to the job ticket. Accordingly, some or all of the logical pages contained in printable file 522 can be printed by print controller 524 without re-referencing a job ticket to receive instructions for the layout parameters for each logical page.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. For example, U.S. application Ser. No. 12/118,191 describes a computer system suitable for storing and/or executing program code that may be adapted for utilization in accordance with the invention.

Although specific embodiments were described herein, the scope of the invention is not limited to those specific embodiments. The scope of the invention is defined by the following claims and any equivalents thereof.

I claim:

1. A print controller in a printing system, the print controller comprising:
   a reprogrammable page description language (PDL) processor that defines a function of a page-break indicator; and
   a job ticket interpreter; wherein
   the print controller is configured to receive a printable file from a host system, the printable file comprising a plurality of page-break indicators, each page-break indicator indicating a logical page; and
   the print controller is configured to receive a job ticket that is associated with the printable file and that comprises layout parameters; and
   the job ticket interpreter is configured to re-define the function of the page-break indicator of the reprogrammable PDL processor in accordance with the layout parameters in the job ticket; and
   the print controller is configured to print a plurality of the logical pages of the printable file after the job ticket interpreter re-defines the function of the page-break indicator.

2. The print controller of claim 1 wherein:
   the print controller is configured to print a plurality of the logical pages of the printable file after the job ticket interpreter re-defines the function of the page-break indicator and before any further reference to the job ticket.

3. The print controller of claim 1 wherein:
   the print controller is configured to print all of the logical pages of the printable file after the job ticket interpreter re-defines the function of the page-break indicator and without further reference to the job ticket.

4. The print controller of claim 1 wherein:
   the reprogrammable PDL processor comprises a PostScript interpreter that defines a function of a showpage operator.

5. The print controller of claim 4 wherein:
   the print controller is configured to print a plurality of the logical pages of a PostScript printable file after the job ticket interpreter re-defines the function of the showpage operator and before any further reference to the job ticket.

6. The print controller of claim 5 wherein:
   the print controller is configured to print all of the logical pages of a PostScript printable file after the job ticket interpreter re-defines the function of the showpage operator and without further reference to the job ticket.

7. The print controller of claim 1 wherein:
   the job ticket interpreter comprises a JDF (Job Definition Format) job ticket interpreter.

8. A method of processing job tickets in a printing system, the method comprising:
   receiving a printable file from a host system, the printable file comprising a plurality of page-break indicators, each page-break indicator indicating a logical page;
   receiving a job ticket associated with the printable file, the job ticket comprising layout parameters;
   re-defining in a reprogrammable page description language (PDL) processor a function of a page-break indicator in accordance with the layout parameters; and
   printing a plurality of the logical pages of the printable file after the job ticket interpreter re-defines the function of the page-break indicator.

9. The method of claim 8, further comprising:
   printing a plurality of the logical pages of the printable file after the job ticket interpreter re-defines the function of the page-break indicator and before any further reference to the job ticket.

10. The method of claim 8, further comprising:
    printing all of the logical pages of the printable file after the job ticket interpreter re-defines the function of the page-break indicator and without further reference to the job ticket.

11. The method of claim 8 wherein:
    receiving the printable file comprises receiving a PostScript printable file containing a PostScript showpage operator;
    re-defining a function of a page-break indicator comprises re-defining the function of the PostScript showpage operator in a PostScript interpreter.

12. The method of claim 8, further comprising:
printing a plurality of the logical pages of the PostScript printable file after the job ticket interpreter re-defines the function of the PostScript showpage operator and before any further reference to the job ticket.

13. The method of claim 8, further comprising:
printing all of the logical pages of the PostScript printable file after the job ticket interpreter re-defines the function of the PostScript showpage operator and without further reference to the job ticket.

14. The method of claim 8 wherein:
receiving the job ticket comprises receiving a JDF job ticket.

* * * * *